UNITED STATES PATENT OFFICE.

MAX HENRY ISLER, OF MANNHEIM, GERMANY, ASSIGNOR TO BADISCHE ANILIN & SODA FABRIK, OF LUDWIGSHAFEN-ON-THE-RHINE, GERMANY, A CORPORATION.

ANTHRACENE DYE AND PROCESS OF MAKING SAME.

No. 893,508.  Specification of Letters Patent.  Patented July 14, 1908.

Application filed March 12, 1908.  Serial No. 420,740.

*To all whom it may concern:*

Be it known that I, MAX HENRY ISLER, chemist, citizen of the Swiss Republic, residing at Mannheim, Germany, have invented new and useful Improvements in Anthracene Dyes and Processes of Making the Same, of which the following is a specification.

I have discovered that new dyes of the anthracene series can be obtained by treating, with glacial acetic acid, or acetic anhydrid, (which for the purposes of my invention are equivalent), in the presence of concentrated, or fuming, sulfuric acid, an anthraquinone compound containing two anthraquinone groups joined together by at least one imino group, and also containing an amino group (which may be mono-substituted) in the alpha position. The new compounds thus obtained dye cotton bluish shades from a hydrosulfite vat.

As instances of the anthraquinone compounds which can be treated according to my invention I mention the diaminodianthraquinonylamin obtainable by reducing the dinitrodianthraquinonylamin described in the specification of Letters Patent No. 860,480; the coloring matter obtainable by melting dinitrodianthraquinonylamin with sodium sulfid as described in the same specification, and the green coloring matter obtainable from 1.4-diamino-2.3-dibromanthraquinone as described in the specification of British Letters Patent No. 7692 A. D. 1904.

The reduction of the aforesaid dinitrodianthraquinonylamin can either be effected in a previous operation, for instance by means of dilute sodium sulfid solution, or the reduction can be carried out in the same operation as that in which the formation of coloring matter takes place, for instance by treating the dinitrodianthraquinonylamin with a mixture of sulfur and fuming sulfuric acid in the presence of glacial acetic acid, or acetic anhydrid.

My new dyes are characterized by being insoluble in water and in alkalies, very difficultly soluble in alcohol, glacial acetic acid and acetone, and soluble in boiling nitrobenzene and quinolin. They are soluble in alkaline hydrosulfite solution yielding vats which dye unmordanted cotton blue shades of excellent fastness.

In particular the dye obtained from diaminodianthraquinonylamin dissolves in concentrated sulfuric acid yielding a green solution.

The following examples will serve to illustrate further the nature of my invention and how it can be performed, but it is not limited to these examples. The parts are by weight.

Example 1. Dissolve ten (10) parts of diaminodianthraquinonylamin in fifty (50) parts of fuming sulfuric acid (containing twenty-three (23) per cent. of free $SO_3$), and add, gradually, from thirty (30), to fifty (50), parts of glacial acetic acid, maintaining the temperature at from forty (40), to fifty (50), degrees centigrade. As soon as the green color of the melt ceases to increase in intensity, pour the melt into water and filter off the coloring matter, which can be purified by extraction with boiling glacial acetic acid and recrystallization from nitrobenzene, or from quinolin. The new coloring matter is insoluble in water and in alkalies, very difficultly soluble in alcohol, glacial acetic acid, and acetone, and soluble in boiling nitrobenzene and quinolin. In concentrated sulfuric acid it yields a green solution. With alkaline hydrosulfite it yields a vat which dyes cotton pure blue shades of excellent fastness. In this example, instead of fuming sulfuric acid, ninety-seven (97) per cent. sulfuric acid can be used, and the glacial acetic acid can be replaced by acetic anhydrid.

Example 2. Dissolve ten (10) parts of the coloring matter obtainable from 1.4-diamino-2.3-dibromanthraquinone as described in the specification of British Letters Patent No. 7692/04, in fifty (50) parts of ninety-seven (97) per cent. sulfuric acid, and from thirty (30), to fifty (50), parts of acetic anhydrid, and proceed as described in the first example. The coloring matter so obtained is difficultly soluble in alcohol and in glacial acetic acid and soluble in boiling nitrobenzene and quinolin.

Example 3. Introduce, at a temperature of from twenty (20), to thirty-five (35), degrees centigrade, ten (10) parts of dinitrodianthraquinonylamin into a solution of two (2) parts of sulfur in one hundred (100) parts of fuming sulfuric acid (containing twenty-three (23) per cent. of free $SO_3$), and then add, slowly, while stirring, at the same temperature, ten (10) parts of acetic anhydrid. Then warm for from eight (8), to ten (10), hours at about thirty (30) degrees centigrade, pour the melt into water, filter off the coloring matter, and wash it till it has a neutral reaction. In this example, if an equal quantity of fuming sulfuric acid, containing forty-five (45) per cent. of free $SO_3$, be substituted for the sulfuric acid, the acetic anhydrid can be replaced by an equal quantity of glacial acetic acid. The coloring matter obtained possesses properties similar to those of the product of the foregoing Example 1.

Now what I claim is:

1. The process of producing coloring matter of the anthracene series by treating with acetic anhydrid in the presence of sulfuric acid an anthraquinone compound containing two anthraquinone groups joined together by at least one imino group and also containing an amino group in the ortho position to a carbonyl group.

2. The process of producing coloring matter of the anthracene series by treating diaminodianthraquinonylamin with acetic anhydrid in the presence of sulfuric acid.

3. The process of producing coloring matter of the anthracene series by treating dinitrodianthraquinonylamin with acetic anhydrid in the presence of fuming sulfuric acid and sulfur.

4. As new articles of manufacture the coloring matters of the anthracene series which can be obtained by treating with acetic anhydrid in the presence of sulfuric acid an anthraquinone compound containing two anthraquinone groups joined together by at least one imino group and also containing an amino group in the ortho position to a carbonyl group which coloring matters are insoluble in water and in alkalies, very difficultly soluble in alcohol, glacial acetic acid and acetone, soluble in boiling nitrobenzene and quinolin and also soluble in alkaline hydrosulfite solution yielding vats which dye unmordanted cotton blue shades of excellent fastness.

5. As a new article of manufacture the coloring matter of the anthracene series which can be obtained by treating diaminodianthraquinonylamin with acetic anhydrid in the presence of sulfuric acid, which coloring matter is insoluble in water and in alkalies, very difficultly soluble in alcohol, glacial acetic acid and acetone, soluble in boiling nitrobenzene and quinolin and also soluble in alkaline hydrosulfite solution yielding a vat which dyes unmordanted cotton blue shades of excellent fastness and which coloring matter also dissolves in concentrated sulfuric acid yielding a green solution.

In testimony whereof I have hereunto set my hand in the presence of two subscribing witnesses.

MAX HENRY ISLER.

Witnesses:
T. ALEC. LLOYD,
ERNEST F. EHRHARDT.